United States Patent
Kim et al.

(10) Patent No.: US 8,810,213 B2
(45) Date of Patent: Aug. 19, 2014

(54) POWER CONTROL METHOD AND APPARATUS FOR TRACKING MAXIMUM POWER POINT IN A PHOTOVOLTAIC SYSTEM

(75) Inventors: Yong-Woo Kim, Seoul (KR); Sang-Keun Ji, Seoul (KR); Sung-Soo Hong, Seoul (KR); Chung-Wook Roh, Seoul (KR); Sang-Kyoo Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 496 days.

(21) Appl. No.: 13/179,118

(22) Filed: Jul. 8, 2011

(65) Prior Publication Data
US 2012/0176102 A1    Jul. 12, 2012

Related U.S. Application Data

(60) Provisional application No. 61/430,409, filed on Jan. 6, 2011.

(30) Foreign Application Priority Data

Jan. 6, 2011    (KR) .................... 10-2011-0001577

(51) Int. Cl.
*G05F 1/46*    (2006.01)
*G05F 1/67*    (2006.01)

(52) U.S. Cl.
CPC . *G05F 1/67* (2013.01); *Y02E 10/58* (2013.01); *Y10S 323/906* (2013.01)
USPC ............................ 323/222; 323/299; 323/906

(58) Field of Classification Search
USPC .......................................... 323/222, 299, 906
See application file for complete search history.

(56) References Cited

U.S. PATENT DOCUMENTS

| | | | | | |
|---|---|---|---|---|---|
| 5,027,051 | A | * | 6/1991 | Lafferty ........................ | 323/222 |
| 5,801,519 | A | * | 9/1998 | Midya et al. .................. | 323/222 |
| 5,932,994 | A | * | 8/1999 | Jo et al. ......................... | 323/222 |
| 6,150,739 | A | * | 11/2000 | Baumgartl et al. ........... | 307/130 |
| 7,479,774 | B2 | * | 1/2009 | Wai et al. ....................... | 323/284 |
| 8,093,872 | B2 | * | 1/2012 | Kiamilev et al. ............. | 323/222 |
| 8,093,873 | B2 | * | 1/2012 | Kiamilev et al. ............. | 323/222 |
| 8,273,979 | B2 | * | 9/2012 | Weir .............................. | 136/244 |
| 8,305,058 | B2 | * | 11/2012 | Kim et al. ...................... | 323/282 |
| 8,339,112 | B2 | * | 12/2012 | Rua et al. ....................... | 323/222 |
| 8,390,261 | B2 | * | 3/2013 | Deboy ........................... | 323/224 |
| 8,456,878 | B2 | * | 6/2013 | Min ................................ | 363/95 |
| 2012/0176102 | A1 | * | 7/2012 | Kim et al. ...................... | 323/234 |

* cited by examiner

*Primary Examiner* — Jeffrey Sterrett
(74) *Attorney, Agent, or Firm* — The Farrell Law Firm, P.C.

(57) ABSTRACT

A power control method for tracking a Maximum Power Point (MPP) in a photovoltaic system including a solar cell and a boost converter. The power control method includes finding the MPP by applying a continuous ON/OFF signal to the boost converter as a first control signal for controlling a duty ratio of the boost converter, and maintaining an operating point of the photovoltaic system at the MPP by applying a second control signal for controlling the duty ratio to the boost converter depending on a constant-voltage command. In tracking an MPP in a photovoltaic system, an MPPT algorithm may remain at the MPP, without self oscillation, improving fast dynamic characteristics upon a change in solar radiation.

18 Claims, 6 Drawing Sheets

POWER CONTROL METHOD AND APPARATUS FOR TRACKING MAXIMUM POWER POINT IN A PHOTOVOLTAIC SYSTEM

PRIORITY

This application claims priority under 35 U.S.C. §119 to a Korean Patent Application filed in the Korean Intellectual Property Office on Jan. 6, 2011 and assigned Ser. No. 10-2011-0001577, and a Provisional patent application filed in the United States Patent and Trademark Office on Jan. 6, 2011 and assigned Ser. No. 61/430,409, the entire disclosures of both of which are hereby incorporated by reference.

BACKGROUND OF THE INVENTION

1. Field of the Invention

The present invention relates generally to a method and apparatus for controlling power in a photovoltaic system, and more particularly, to a power control method and apparatus for tracking a maximum power point in the photovoltaic system

2. Description of the Related Art

With the depletion of natural resources and the emerging environmental and safety issues surrounding existing power generation methods such as thermal power generation and nuclear power generation, many studies are being conducted on photovoltaic power generation, which is an example of a renewable energy source.

Photovoltaic power generation, a clean energy source that does emit pollutants that are harmful to the global environment, such as greenhouse gases, may be applied to residential power systems and vehicle power systems, and also to various other fields such as streetlights, lighthouses, and communication devices.

When a photovoltaic power generation system (or a photovoltaic system for short) generates its maximum power, the intersection of power and voltage on a power-voltage (P-V) characteristic curve of a solar cell is called a Maximum Power Point (MPP). Power generated by the photovoltaic system may be subject to change depending on the surrounding environment such as solar intensity, temperature, and cloud coverage.

Therefore, it is important for the photovoltaic system to maintain the system operating point (i.e., operation voltage of its solar cells) at an MPP, where output powers of the solar cells are highest, by tracking the MPP to make it possible to generate the maximum power in the time-varying surrounding environment. To maintain the system operating point at an MPP, a variety of algorithms have been proposed, which will be referred to as Maximum Power Point Tracking (MPPT) algorithms.

FIG. 1 is a graph illustrating power-voltage (P-V) characteristics of a conventional MPPT algorithm.

Referring to FIG. 1, on a P-V characteristic curve of a solar cell or photovoltaic (PV) array, a PV array voltage at an MPP 101 is $V_{max}$. Further, a voltage slope and a power slope are directly proportional in a range of a PV array voltage lower than the PV array voltage $V_{max}$, and the voltage slope and power slope are inversely proportional in a range of a PV array voltage higher than the PV array voltage $V_{max}$. Based on these characteristics, digital control devices may measure an infinitesimal fluctuation between the discrete current value and previous value of a power value, and determine a switching operation for MPPT. A Perturbation and Observation (P&O) scheme, which is a typical example of the MPPT algorithm, is often used because it has a simple feedback structure and a small number of measurement parameters.

FIG. 2 illustrates a P&O scheme according to a conventional MPPT algorithm. Specifically, the P&O scheme operates by periodically increasing and decreasing an operating voltage of a solar cell, and tracking and finding the MPP by comparing a previous output power with a current output power of the solar cell during the disturbance period.

Referring to FIG. 2, in step 201, an output power of a solar cell is measured. The power measurement may be performed at stated periods. In step 203, a current power measured in the current period is compared with a previous power measured in the previous period. If the current power is less than the previous power, a terminal voltage (or current voltage) of the solar cell in the current period is compared with a terminal voltage (or previous voltage) of the solar cell in the previous period in step 205. If the current voltage is greater than the previous voltage, the terminal voltage of the solar cell is gradually decreased by a predetermined increment in step 207. Step 207 is performed to approximate a power point of a point B3 to the MPP 101, when the power point has moved, for example, from a point B2 to the point B3 on the P-V characteristic curve illustrated in FIG. 1.

However, if the current voltage is less than the previous voltage in step 205, the terminal voltage of the solar cell is gradually increased by a predetermined increment in step 209. Step 209 is performed to approximate a power point of the point B2 to the MPP 101, when the power point has moved, for example, from a point B4 to the point B2 on the P-V characteristic curve illustrated in FIG. 1.

If the current power is greater than the previous power in step 203, the current voltage of the solar cell is compared with the previous voltage of the solar cell in step 211. If the current voltage is less than the previous voltage, the terminal voltage of the solar cell is gradually decreased by a predetermined increment in step 213. Step 213 is performed to approximate a power point of the point B4 to the MPP 101, when the power point has moved, for example, from the point B3 to the point B4 on the P-V characteristic curve illustrated in FIG. 1.

However, if the current voltage is greater than the previous voltage in step 211, the terminal voltage of the solar cell is gradually increased by a predetermined increment in step 215. Step 215 is performed to approximate a power point of the point B2 to the MPP 101, when the power point has moved, for example, from the point B1 to the point B2 on the P-V characteristic curve illustrated in FIG. 1.

If an output power of a solar cell increases, the disturbance will continuously increase in the same direction during the next period, and otherwise, the disturbance direction will be reversed, meaning that the voltage of the solar cell is disturbed over all MPPT periods. Therefore, even though solar radiation is constant when the output power of the solar cell has reached the MPP, the terminal voltage of the solar cell may undergo self oscillation by the P&O scheme, resulting in a reduction in the efficiency of the photovoltaic system.

In order to minimize the efficiency reduction, the P&O scheme may consider reducing the unit amount or the disturbance increment by which the voltage of the solar cell is increased and/or decreased gradually. In this case, however, a sudden change in the solar radiation may cause an increase in the latency in tracking and finding the MPP.

SUMMARY OF THE INVENTION

Accordingly, the present invention has been made to solve the above-mentioned problems occurring in the prior art, and to provide at least the advantages as describe below.

An aspect of the present invention is to provide a power control method and apparatus capable of reducing latency in tracking an MPP in a photovoltaic system.

Another aspect of the present invention is to provide a power control method and apparatus for tracking an MPP, taking solar radiation into account, in a photovoltaic system.

Another aspect of the present invention is to provide a power control method and apparatus capable of preventing self oscillation in tracking an MPP in a photovoltaic system.

In accordance with an aspect of the present invention, a power control method is provided for tracking an MPP in a photovoltaic system including a solar cell and a boost converter. The power control method includes finding the MPP by applying a continuous ON/OFF signal to the boost converter as a first control signal for controlling a duty ratio of the boost converter; and maintaining an operating point of the photovoltaic system at the MPP, depending on a constant-voltage command.

In accordance with another aspect of the present invention, a power control apparatus is provided for tracking an MPP in a photovoltaic system using a solar cell. The power control apparatus includes a boost converter for supplying a power output from the solar cell to a load; and a control unit for finding the MPP by applying a continuous ON/OFF signal to the boost converter as a first control signal for controlling a duty ratio of the boost converter, and maintaining an operating point of the photovoltaic system at the MPP, depending on a constant-voltage command.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configurations and components are merely provided to assist in the overall understanding of the embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
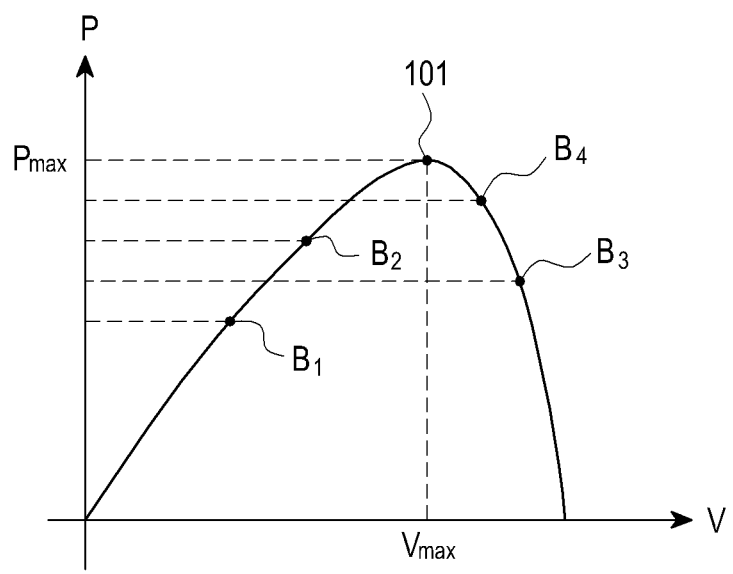
FIG. 1 is a graph illustrating power-voltage (P-V) characteristics of a conventional MPPT algorithm.
Figure 2:
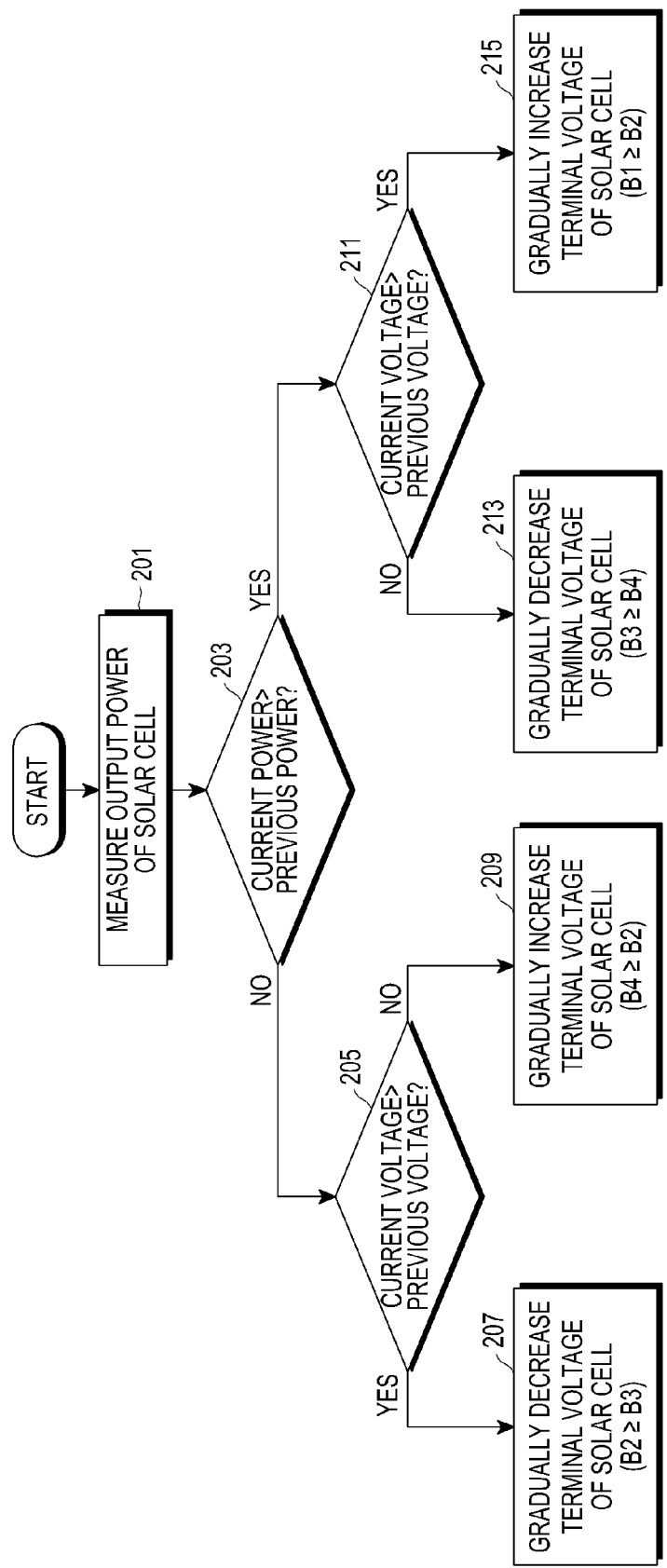
FIG. 2 is a flowchart illustrating a P&O scheme according to a conventional MPPT algorithm.
Figure 3:
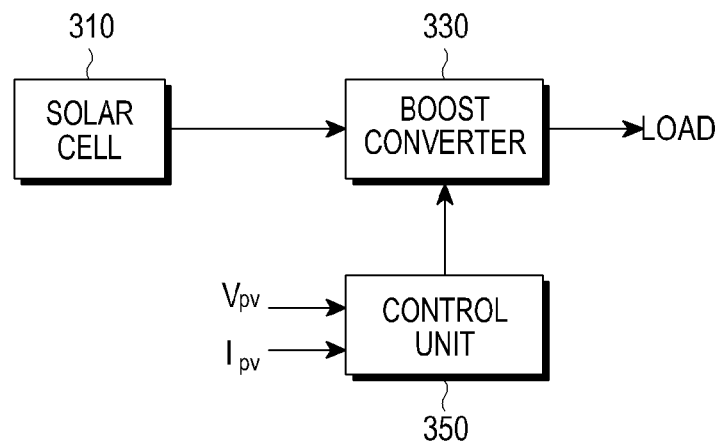
FIG. 3 is a block diagram illustrating a photovoltaic system according to an embodiment of the present invention.

FIG. 3 illustrates a photovoltaic system according to an embodiment of the present invention.

Referring to FIG. 3, the photovoltaic system includes a solar cell 310, a boost converter 330, and a control unit 350.

The solar cell 310 converts solar light energy into electric energy. The solar cell 310 includes, for example, a photovoltaic (PV) array. The boost converter 330 supplies the power output from the solar cell 310 to a load. The power being supplied from the boost converter 330 to the load is a power that tracks an MPP under control of the control unit 350. The boost converter 330 includes, for example, a DC/DC converter circuit.

The control unit 350 periodically or aperiodically receives an output voltage $V_{PV}$ and an output current $I_{PV}$ of the solar cell 310, and outputs a Pulse Width Modulation (PWM) control signal so that the output voltage $V_{PV}$ of the solar cell 310 may track the MPP. The output voltage $V_{PV}$ of the solar cell 310 is a terminal voltage of the solar cell 310, while the output current $I_{PV}$ is a current flowing between the solar cell 310 and the boost converter 330.

In accordance with an embodiment of the present invention, the control unit 350 controls power of the solar cell 310 in different ways depending on whether the solar radiation is variable or constant. In the following description, an operation mode in which the control unit 350 operates during an initial start-up and where solar radiation is variable will be referred to as a "first mode", and an operation mode in which the control unit 350 is operating after the initial start-up and where solar radiation is constant will be referred to as a "second mode".

In the first mode, the control unit 350 first controls power of the solar cell 310 to fast track the MPP during the initial start-up of the photovoltaic system according to an embodiment of the present invention or when solar radiation is variable. The control unit 350 outputs a first PWM control signal for continuously increasing or decreasing a duty ratio of the boost converter 330, until the solar cell 310 reaches the MPP (i.e., until the system operating point reaches the MPP).

In accordance with an embodiment of the present invention, in the first mode, the control unit 350 monitors a change in the output power of the solar cell 310 in real time, while continuously decreasing, for example, the terminal voltage (output voltage) of the solar cell 310 starting with an open-circuit voltage $V_{OC}$. The output power of the solar cell 310 increases in proportion to a decrease in the output voltage of the solar cell 310, until the system operating point reaches the MPP. However, from the moment the system operating point passes the MPP, the output power of the solar cell 310 decreases in proportion to a decrease in the output voltage of the solar cell 310. The control unit 350 may find the MPP of the system by detecting this increment/decrement switch of the output power in the first mode. The control unit 350 memorizes the output voltage and the output power of the solar cell 310, which correspond to the found MPP.

Once the solar cell 310 reaches the MPP, the control unit 350 will control power of the solar cell 310 according to the second mode. In the second mode, the control unit 350 outputs a second PWM control signal for controlling the duty ratio of the boost converter 330 to be constant according to a constant-voltage command.

Alternatively, the control unit 350 may use MPPs, which are individually preset for solar radiation values. In this case, the control unit 350 may store and manage information about the MPPs mapped to their associated solar radiations as, for example, table information. In other words, in the former embodiment, the control unit 350 finds the MPP by monitoring a change in the output voltage of the solar cell 310 in real time, whereas in the latter embodiment, the control unit 350 shifts the system operating point to the MPP by continuously increasing or decreasing the terminal voltage of the solar cell 310 up to a preset MPP voltage in accordance with an operation of the first mode.

Figure 4:
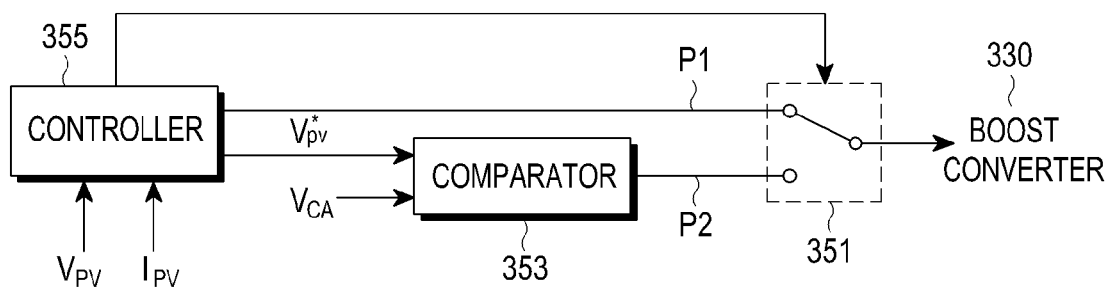
FIG. 4 is a diagram illustrating a control unit of a photovoltaic system according to an embodiment of the present invention.

FIG. 4 is a diagram illustrating a control unit of a photovoltaic system according to an embodiment of the present invention.

Referring to FIG. 4, the control unit 350 includes a switch 351, a comparator 353, and a controller 355. The switch 351 switches an output path of the controller 355 to a first path P1 so that the output power of the solar cell 310 may fast track the MPP, i.e., a first PWM control signal associated with the first mode may be output to the boost converter 330, during an initial start-up of the system or when solar radiation is variable.

The first PWM control signal is an ON/OFF signal for continuously increasing or decreasing the duty ratio of the boost converter 330, until the output power of the solar cell 310 reaches the MPP.

For example, the duty ratio increases while an ON signal is continuously output as the first PWM control signal, whereas the duty ratio decreases while an OFF signal is continuously output as the first PWM control signal. If the duty ratio increases in the boost converter 330, a current flowing through the boost converter 330 increases, so an output current $I_{PV}$ of the solar cell 310 connected to the boost converter 330 increases and an output voltage $V_{PV}$ thereof decreases. However, if the duty ratio decreases in the boost converter 330, a current flowing through the boost converter 330 decreases, so an output current $I_{PV}$ of the solar cell 310 decreases and an output voltage $V_{PV}$ thereof increases.

Therefore, in accordance with an embodiment of the present invention, the output voltage $V_{PV}$ of the solar cell 310 continuously decreases without self oscillation while the first PWM control signal is output as an ON signal, whereas the output voltage $V_{PV}$ of the solar cell 310 continuously increases without self oscillation while the first PWM control signal is output as an OFF signal. For example, an ON signal is output as the first PWM control signal, until the output voltage of the solar cell 310 reaches the MPP, if it is greater than an operating voltage of the MPP, whereas an OFF signal is output as the first PWM control signal, until the output voltage of the solar cell 310 reaches the MPP, if it is less than an operating voltage of the MPP.

As a result, the latency required until the solar cell 310 reaches the MPP may be dramatically reduced.

The switch 351 switches an output path of the controller 355 to a second path P2 so that the solar cell 310 may maintain the MPP, i.e., a second PWM control signal associated with the second mode may be output to the boost converter 330, when the system reaches the MPP and the solar radiation is constant.

The comparator 353 compares a voltage command $V_{PV*}$, which is output from the controller 355 according to the second mode, with a predetermined carrier waveform $V_{CA}$, and outputs "1" if, for example, the voltage command $V_{PV*}$ is greater than the carrier waveform $V_{CA}$ in voltage, but outputs "0" if the voltage command $V_{PV*}$ is less than the carrier waveform $V_{CA}$ in voltage.

In accordance with an embodiment of the present invention, the voltage command $V_{PV*}$ may be set to a voltage having a constant level. The second PWM control signal associated with the second mode controls an operation of the boost converter 330 with a constant duty ratio according to the levels of the voltage command $V_{PV*}$ and the carrier waveform $V_{CA}$. The constant duty ratio is set as an appropriate ratio so that the output power of the solar cell 310 may maintain the MPP, and for example, a sawtooth waveform may be used as the carrier waveform $V_{CA}$ being input to the comparator 353.

The controller 355 measures an output power of the solar cell 310 by periodically or aperiodically receiving an output voltage $V_{PV}$ and an output current $I_{PV}$ of the solar cell 310, and outputs a continuous ON/OFF signal as a first PWM control signal so that the output power of the solar cell 310 may track the MPP during initial start-up of the system or when solar radiation is variable. The controller 355 controls the switch 351 so that its output path may be switched to the first path P1. The controller 355 detects an increment/decrement switch of the output power of the solar cell 310, which is increased or decreased according to the first PWM control signal, and stores, as the MPP, a system operating point where the output power of the solar cell 310 is highest.

If there is no change in solar radiation after the initial start-up is completed, the controller 355 outputs a second PWM control signal so that the output power of the solar cell 310 may maintain the MPP. In this case, the controller 355 controls the switch 351 so that its output path may be switched to the second path P2.

In accordance with an embodiment of the present invention, the controller 355 determines that there is a change in solar radiation, upon detecting a change in the output power of the solar cell 310 while maintaining the system operating point with a constant-voltage command in the second mode. Upon detecting a change in solar radiation, the controller 355 re-performs an operation of the first mode and finds an MPP in the changed solar radiation.

For example, if the output power of the solar cell 310 increases during an operation of the second mode, the controller 355 determines that the solar radiation has increased, and finds a new MPP corresponding to the changed solar radiation while increasing the output voltage of the solar cell 310 according to the first mode. However, if the output power of the solar cell 310 decreases during an operation of the second mode, the controller 355 determines that the solar radiation has decreased, and finds a new MPP corresponding to the changed solar radiation while decreasing the output voltage of the solar cell 310 according to the first mode.

Alternatively, a separate solar radiation measurement unit may be provided to detect a change in solar radiation, or an operation mode switch command associated with a change in solar radiation may be received from an operator.

In the above-described embodiments, a change in solar radiation may be detected depending on, for example, whether a change in the output power of the solar cell 310 exceeds a predetermined threshold during an operation of the second mode. Various other methods capable of measuring a change in solar radiation may also be applied.

In the above-described structure of the present invention, the boost converter 330 and the control unit 350 constitute a power control apparatus of a photovoltaic system, which tracks an MPP. Compared with the conventional MPPT algorithm, which undergoes self oscillation around the MPP, the system illustrated in FIG. 3 may fast track the MPP without using an infinitesimal fluctuation of the output power $V_{PV}$ of the solar cell 310.

Figure 5:
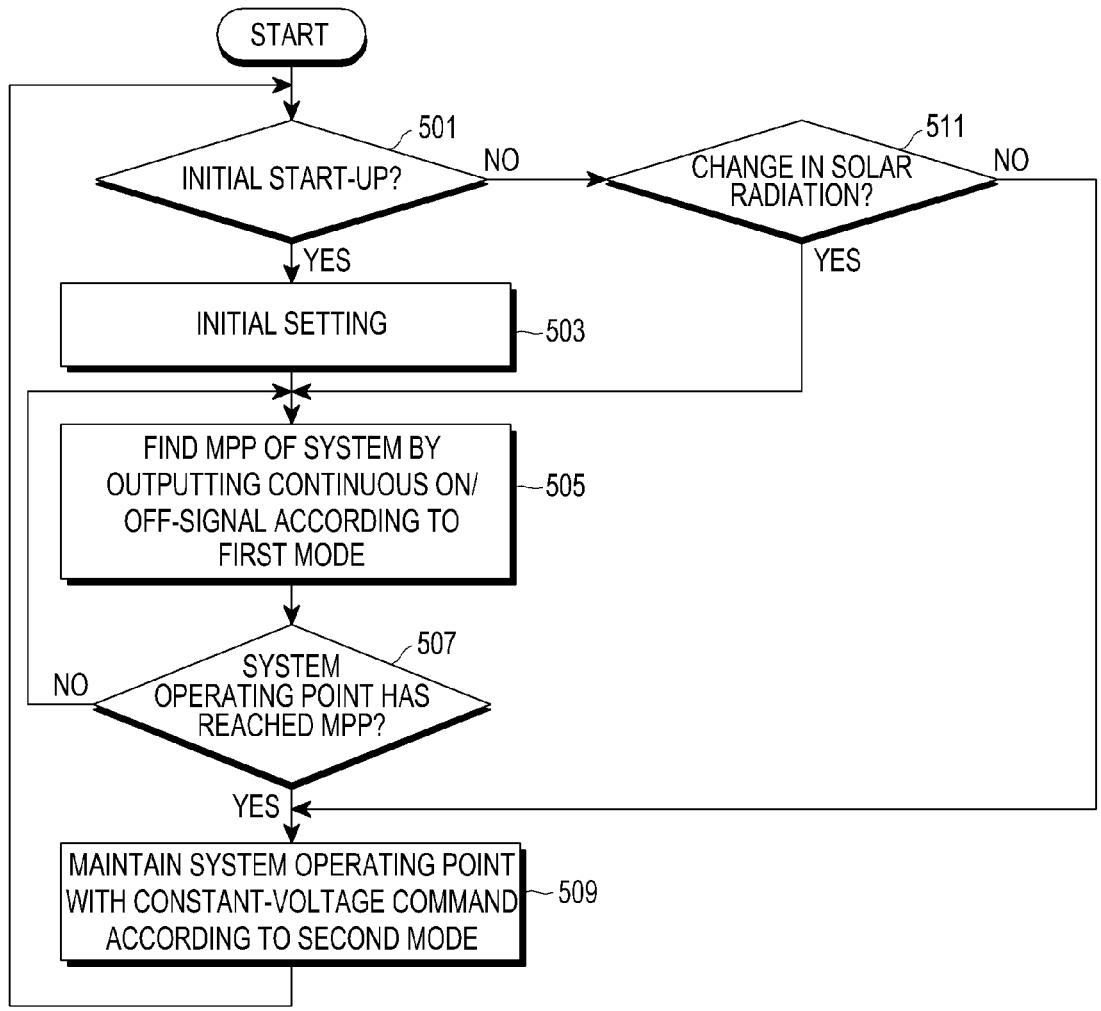
FIG. 5 is a flowchart illustrating a power control method in a photovoltaic system according to an embodiment of the present invention.

FIG. 5 illustrates a power control method in a photovoltaic system according to an embodiment of the present invention.

Referring to FIG. 5, in step 501, the control unit 350 determines whether the system is in its initial start-up phase. If the system is in its initial start-up phase, the control unit 350 sets an initial voltage of the solar cell 310 to an initial value in step 503. The initial voltage is assumed to be set to, for example, a predetermined open-circuit voltage $V_{OC}$ of the system during initial start-up.

In step 505, the control unit 350 outputs a continuous ON/OFF signal for controlling a duty ratio of the boost converter 330 according to the first mode, as a first PWM control signal, to find an MPP of the system.

For example, because an output voltage of the solar cell 310 is an open-circuit voltage $V_{OC}$ during initial start-up of the system, the system operating point at that time is located on the right side of the MPP on a P-V characteristic curve. Therefore, the control unit 350 outputs a continuous ON-signal as the first PWM control signal to find a MPP of the system while decreasing the output voltage of the solar cell 310.

In other words, when the system operating point is located on the right side of the MPP on the P-V characteristic curve, the control unit 350 outputs, for example, a continuous ON-signal because it should decrease the output voltage of the solar cell 310 in order to shift the system operating point to the MPP. However, when the system operating point is located on the left side of the MPP, the control unit 350 outputs, for example, a continuous OFF-signal to increase the output voltage of the solar cell 310 in order to shift the system operating point to the MPP.

In step 507, the control unit 350 determines if the system operating point has reached the MPP, and continues the operation of step 505 until the system operating point reaches the MPP. If the system operating point has reached the MPP in step 507, the control unit 350 outputs a second PWM control signal associated with a constant-voltage command according to the second mode, to maintain the system operating point at the MPP in step 509. The constant-voltage command may include the output voltage of the solar cell 310, which corresponds to the MPP in step 507.

Thereafter, the control unit 350 periodically or aperiodically repeats the operation of step 501 and its succeeding steps.

If the system is not in its initial start-up phase in step 501, the control unit 350 determines whether there is a change in solar radiation in step 511. The control unit 350 may determine that there is a change in solar radiation, upon detecting the output power of the solar cell 310, which has changed by a predetermined threshold or more, while maintaining the system operating point with a constant-voltage command in the second mode.

Upon detecting the change in solar radiation in step 511, the method proceeds to step 505 and the control unit 350 re-performs the operation of the first mode to shift the system operating point to the MPP corresponding to the changed solar radiation. The succeeding operation is performed as described above. Accordingly, repetitive description thereof will be omitted.

Figure 6:
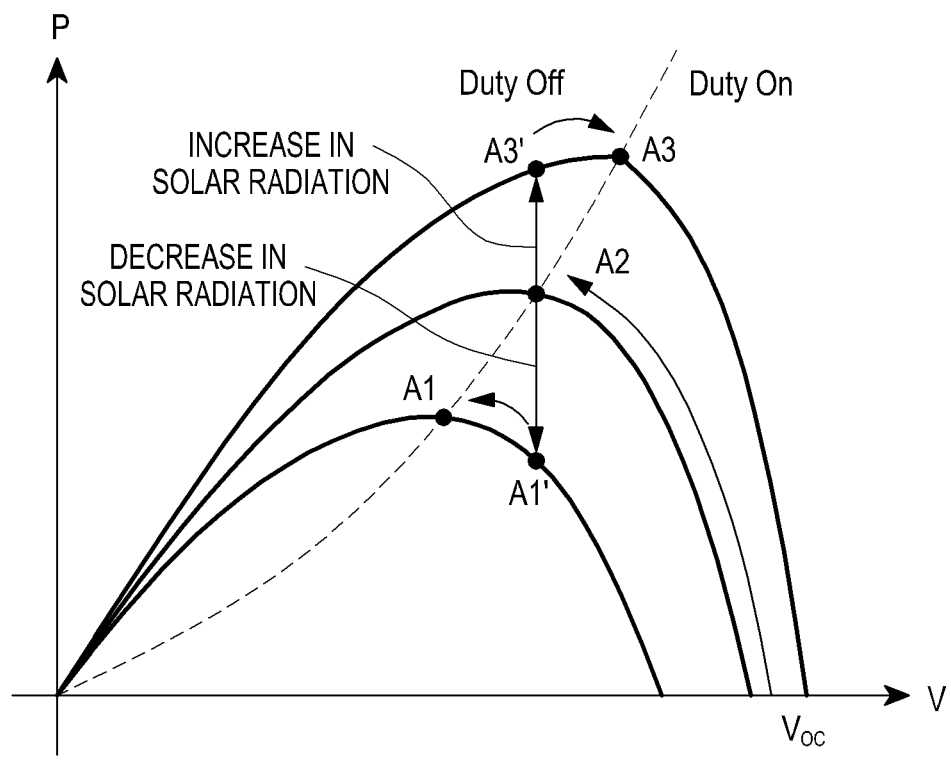
FIG. 6 is a graph illustrating power-voltage (P-V) characteristics in a photovoltaic system according to an embodiment of the present invention.

FIG. 6 is a graph illustrating power-voltage (P-V) characteristics in a photovoltaic system according to an embodiment of the present invention. Specifically, a power control method according to an embodiment of the present invention will be described in detail with reference to FIG. 6.

Assuming that on the P-V characteristic curve illustrated in FIG. 6, an MPP is first A2 at the current solar radiation, the system operation is as follows on the assumption that during initial start-up of the system, the initial voltage of the solar cell 310 is an open-circuit voltage $V_{OC}$. At the open-circuit voltage $V_{OC}$, the current system operating point is located on the left side of the MPP. Therefore, the controller, e.g., as illustrated in FIG. 4, switches the switch 351 to the first path P1, and outputs a continuous ON-signal as a first PWM control signal, to shift the system operating point to the MPP. In this case, the output voltage of the solar cell 310 is decreased in the MPP direction.

During the initial start-up, the system operating point reaches the MPP at a time without self oscillation, and the controller 355 stores the output voltage and the output power of the solar cell 310 at the MPP, completing the operation of the first mode. Thereafter, the controller 355 performs an operation of the second mode, based on the memorized output voltage defined as a voltage command. Compared with a conventional MPPT algorithm for tracking an MPP while continuously changing the voltage command, an embodiment of the present invention may prevent degradation of the system efficiency due to self oscillation by using the memorized constant output voltage as a voltage command.

If the current system operating point is the point A2 and the current output power is higher than the previously recorded output power, due to an increase in solar radiation, the system operating point is changed from the point A2 to a point A3'. However, because the point A3' is not an MPP at the solar radiation, the system operating point should be shifted to a point A3 corresponding to the MPP.

In this case, if the output power of the solar cell 310 increases during an operation of the second mode, the controller 355 switches the switch 351 to the first path P1, determining that the solar radiation has increased, and outputs a continuous OFF-signal as a first PWM control signal, to shift the system operating point to the MPP while increasing the output voltage of the solar cell 310. After shifting the system operating point to the point A3, the controller 355 records the output power and the output voltage of the point A3 as the MPP, and performs an operation of the second mode based on the recorded output voltage defined as a voltage command. The voltage command has a constant voltage depending on the memorized output voltage.

If the current system operating point is the point A2 and the current output power is lower than the previously recorded output power, due to an decrease in solar radiation, the system operating point is changed from the point A2 to a point A1'. However, because the point A1' is not an MPP at the solar radiation, the system operating point should be shifted to a point A1 corresponding to the MPP.

In this case, if the output power of the solar cell 310 decreases during an operation of the second mode, the controller 355 switches the switch 351 to the first path P1, determining that the solar radiation has decreased, and outputs a continuous ON-signal as a first PWM control signal, to shift the system operating point to the MPP while decreasing the output voltage of the solar cell 310. After shifting the system operating point to the point A1, the controller 355 records the output power and the output voltage of the point A1 as the MPP, and performs an operation of the second mode based on the recorded output voltage defined as a voltage command. The voltage command has a constant voltage depending on the memorized output voltage.

Figure 7A:
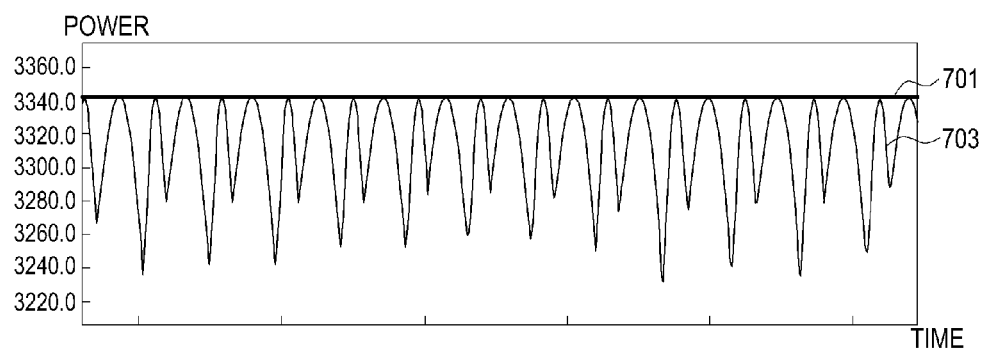
FIGS. 7A and 7B are diagrams illustrating simulation waveforms for performance comparison between an MPPT algorithm according to an embodiment of the present invention and a conventional P&O scheme-based MPPT algorithm.
Figure 7B:
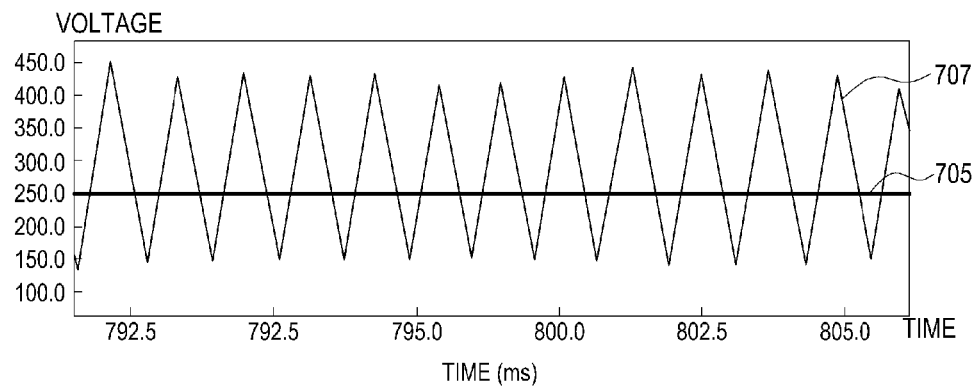

FIGS. 7A and 7B illustrate simulation waveforms for performance comparison between an MPPT algorithm according to an embodiment of the present invention and a conventional P&O scheme-based MPPT algorithm.

In FIG. 7A, reference numeral 701 represents an output power of an MPPT algorithm according to an embodiment of the present invention, and reference numeral 703 represents an output power of a conventional P&O scheme-based MPPT algorithm. In the simulation of FIG. 7A, while the output power of the conventional P&O scheme is 3,310 W, the output power of the present invention is 3,341 W, ensuring performance improvement of about 30 W.

In FIG. 7B, reference numeral 705 represents a constant-voltage command without self oscillation in the MPPT algorithm according to an embodiment of the present invention, and reference numeral 707 represents a voltage command that periodically changes, i.e., undergoes self oscillation, in the conventional P&O scheme-based MPPT algorithm.

As is apparent from the foregoing description, in tracking an MPP in a photovoltaic system, an MPPT algorithm according to an embodiment of the present invention may remain at the MPP without self oscillation, ensuring fast dynamic characteristics upon a change in solar radiation, and thus improving the efficiency of the photovoltaic system compared with the conventional MPPT algorithm.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A power control method for tracking a Maximum Power Point (MPP) in a photovoltaic system including a solar cell and a boost converter, comprising:
   finding the MPP by applying a continuous ON signal or a continuous OFF signal to the boost converter as a first control signal for controlling a duty ratio of the boost converter to be continuously increased or continuously decreased without self-oscillation; and
   maintaining an operating point of the photovoltaic system at the MPP, depending on a constant-voltage command.

2. The power control method of claim 1, wherein maintaining the operating point of the photovoltaic system comprises applying a second control signal for controlling the duty ratio to the boost converter, depending on the constant-voltage command.

3. The power control method of claim 2, wherein each of the first control signal and the second control signal includes a Pulse Width Modulation (PWM) control signal for controlling the duty ratio.

4. The power control method of claim 1, wherein finding the MPP comprises outputting a continuous ON-signal as the first control signal to find the MPP while decreasing an output voltage of the solar cell, if the solar cell has an open-circuit voltage during initial start-up.

5. The power control method of claim 1, further comprising:
   detecting a change in output power of the solar cell while maintaining the operating point of the photovoltaic system; and
   determining that there is a change in solar radiation.

6. The power control method of claim 5, wherein determining that there is the change in the solar radiation comprises:
   determining that the solar radiation has increased, if the output power of the solar cell increases; and
   finding a new MPP corresponding to the changed solar radiation while increasing the output voltage of the solar cell.

7. The power control method of claim 5, wherein determining that there is the change in the solar radiation comprises:
   determining that the solar radiation has decreased, if the output power of the solar cell decreases; and
   finding a new MPP corresponding to the changed solar radiation while decreasing the output voltage of the solar cell.

8. A power control apparatus for tracking a Maximum Power Point (MPP) in a photovoltaic system using a solar cell, comprising:
   a boost converter for supplying a power output from the solar cell to a load; and
   a control unit for finding the MPP by applying a continuous ON signal or a continuous OFF signal to the boost converter as a first control signal for controlling a duty ratio of the boost converter to be continuously increased or continuously decreased without self-oscillation, and maintaining an operating point of the photovoltaic system at the MPP, depending on a constant-voltage command.

9. The power control apparatus of claim 8, wherein the control unit determines that there is a change in solar radiation, upon detecting a change in output power of the solar cell while maintaining the operating point of the photovoltaic system, depending on the constant-voltage command.

10. The power control apparatus of claim 9, wherein if the output power of the solar cell increases, the control unit determines that the solar radiation has increased, and finds a new MPP corresponding to the changed solar radiation while increasing the output voltage of the solar cell.

11. The power control apparatus of claim 9, wherein if the output power of the solar cell decreases, the control unit determines that the solar radiation has decreased, and finds a new MPP corresponding to the changed solar radiation while decreasing the output voltage of the solar cell.

12. The power control apparatus of claim 8, wherein the control unit applies a second control signal for controlling the duty ratio to the boost converter depending on the constant-voltage command, to maintain the operating point of the photovoltaic system at the MPP.

13. The power control apparatus of claim 12, wherein each of the first control signal and the second control signal includes a Pulse Width Modulation (PWM) control signal for controlling the duty ratio.

14. The power control apparatus of claim 12, wherein the control unit comprises a comparator for comparing the constant-voltage command with a predetermined reference voltage and outputting the second control signal.

15. The power control apparatus of claim 12, wherein the control unit controls the duty ratio of the boost converter by switching an output path of the first control signal and the second control signals according to an operation mode.

16. The power control apparatus of claim 15, wherein the control unit comprises a switch for switching the output path.

17. The power control apparatus of claim 16, wherein the control unit comprises a comparator for comparing the constant-voltage command with a predetermined reference voltage and outputting the second control signal.

18. The power control apparatus of claim 8, wherein if the solar cell has an open-circuit voltage during initial start-up, the control unit outputs a continuous ON-signal as the first control signal to find the MPP while decreasing an output voltage of the solar cell.

* * * * *